United States Patent Office 2,838,457
Patented June 10, 1958

2,838,457
LOW TEMPERATURE LOW VISCOSITY HYDRAULIC OIL

Oliver M. Ballentine, Whippany, N. J., assignor to the United States of America as represented by the Secretary of the Air Force No Drawing. Application February 6, 1957
Serial No. 638,663

2 Claims. (Cl. 252—78)

(Granted under Title 35, U. S. Code (1952), sec. 266)

The invention described herein may be manufactured and used by or for the United States Government for governmental purposes without the payment to me of any royalty thereon.

This invention pertains to an oil used at low temperatures in the lubrication of moving mechanisms. The oil is characterized by a minimum of opposition to movement. The invention more particularly pertains to an improved oil additive composition. The invention is a fluid hydraulic oil which is particularly adapted for use with moving mechanisms in pilotless aircraft, missiles and comparable devices, operating at temperatures down to about −100° F., which corresponds to −73° C.

As a background for making the present invention as presented in claims herein clearly understandable, reference is made to the large accumulation of literature on lubrication. Among the additives serving to impart fluidity to lubricants at low temperatures and to reduce their foaming characteristics are silicon compounds presented adequately in the 1951 edition of "Introduction to the Chemistry of the Silicons," by Eugene G. Rochow, published by John Wiley & Sons, Inc., New York, New York.

Silicon is tetracovalent with a maximum covalency of 6 attained only with elements such as fluorine and oxygen. The simplest covalent silicon compounds are the hydrides, of which monosilane or simple silane of formula $SiH_4$ is at the bottom of a homologous series with disilane $Si_2H_6$ next and with hexasilane $Si_6H_{14}$ as the highest reported member, because of an inherent instability in the silicon chain which is unkown in the corresponding carbon chain. The silicon hydrides or the silanes are so extremely sensitive to oxygen that they ignite in air. The molal heat of oxidation of silicon is twice that of carbon. Silicon-oxygen-silicon or siloxane linkages form straight chain compounds and also form cyclosiloxanes or ring compounds. The simplest polyorgano siloxane is dimethylsiloxane $$[(CH_3)_2SiO]_x$$

or methylsilicone. The term silicone is unsupported by any conclusive evidence of analogy between the siloxane bond and the carbonyl ketone group of organic chemistry. The term methylsilicone is used herein to refer to methylpolysiloxanes. The dimethylsiloxanes or silicones are polymeric organic silicon compounds which are useful as additives to lubricants, as froth suppressants and the like.

The silicones, as such, are not satisfactory lubricants in hydraulic systems using hydraulic pumps where metal-to-metal contact occurs in pumping action. The silicones are not regarded as being satisfactory lubricants for steel-on-steel, steel-on-bronze, etc. under load.

The addition to lubricating oils of materials to improve lubrication, to retard oxidation, to improve viscosity index, to improve film strength and hence to depress frothing, to improve corrosion characteristics, etc. are current practice in the lubricating industry. Oil film strength improvers and oxidation inhibitors include chlorine. The chlorine commonly is compounded with a fatty oil or the like, which is then blended with mineral oils. A mineral oil may possess an average load carrying capacity of 3,000 to 4,000 pounds per square inch on plain bearings. When compounded with a chlorine containing oil, the load carrying capacity of the same mineral oil on the same plain bearings is increased to 40,000 pounds per square inch, or about tenfold.

A brief summary of the invention follows indicating its nature and substance together with a statement of the object of the invention commensurate and consistent with the invention as claimed and setting out the exact nature, the operation and the essence of the invention complete with proportions and the techniques that are necessary for its use, together with the purpose of the invention. The presentation is adequate for any person, who is skilled in the art and science to which the invention pertains, to use it without involving expensive experimentation. The best mode of carrying out the invention is presented by the citing of a specific operative example inclusive of the preparation and the use of at least one example of the invention.

A brief summary of the present invention is the compounding of a base stock with an additive as a lubricant for steel-to-steel bearing contact. The base stock is a mixture of a dimethyl silicone oil polymerized to a viscosity of 2 centistokes in a range proportion by weight of between 30 to 46%, with a dimethyl silicone oil polymerized to a viscosity of 100 centistokes in a range proportion by weight of between 42 and 58%. The additive contains a mixture of dichlorotrifluoro propane in a range proportion by weight of between 6 to 14%, with 2,6 ditertiarybutyl 4 methylphenol in a range proportion by weight of between 0.3 to 1.5%. The formulation at room temperature in chart form is a mixed base stock of 50.0%±8% by wt. dimethyl silicone oil (100 cs.)
38.0%±8% by wt. dimethyl silicone oil (2 cs.)

with additives consisting of 11.3%+2.7% to −5.3% by wt. dichlorotrifluoro propane
0.7%+0.8% to −0.4% by wt. ditertiary butyl 4 methyl phenol The object of the present invention is to provide a satisfactory lubricant for moving mechanical parts at operating temperatures down to about −100° F.

The inclusion in the above formulation of the chlorofluoro compounds impart wear improvement to the otherwise poor lubricating characteristics of the silicone fluids. The chloro-fluoro propane mixtures act as snuffers and reduce the flammability of an otherwise flammable material. The phenol additive is primarily an oxidation inhibitor.

The present invention has resulted from development work on fluids for use as a hydraulic oil in pilotless missiles, aircraft and in comparable installations. A fluid was sought which was capable of operating successfully in isolated control regions such as in unattended pilotless aircraft equipment, such as radar antenna and the like, under temperatures as low as −100° F., wherein the viscosity-temperature relationship was of great importance. Servo valves are critical components of the pilotless aircraft hydraulic systems and must operate in tolerances of one to two thousandths of one inch. Quick control surface response is essential to pilotless aircraft. The low temperatures, lags in control systems, because of increases of the viscosity of fluids in the systems are most undesirable. A missile may be rendered uncontrollable by actuators which are caused to stick by a sluggish fluid of a viscosity which increases objectionably at those temperatures under which the missile is flown. Hydraulic oils of suitable viscosity at the low temperatures encountered by the missiles during flight have not been available prior to the development of the present invention.

The accepted practice prior to the present time has been the burdening of missiles with equipment for preheating and for heating hydraulic oils and the like, where such procedure is requisite in the missiles. The requirements that the hydraulic oils and the like, in the missiles be heated complicates the hydraulic systems and necessitates operations in preparing the missile for flight which may be advantageously avoided. The low temperature, low viscosity hydraulic oil which is the subject matter of the present invention assists in alleviating the described problems of missile flight.

The oil which is contemplated hereby is compatible with United States Air Force packings. The oil has good hydrolytic and sonic shear stability and it is noncorrosive. The oil has a flat viscosity-temperature curve slope of 187.0 centistokes at −88° F. and of 6.8 centistokes at 210° F. This flat oil viscosity curve indicates that the oil is operable with a high degree of sensitivity over a wide temperature range of from −100° F. to 160° F.

The oil which is contemplated hereby specifically eliminates the requirement for the preheating of hydraulic oils, as presently practiced in the United States Air Force. Specific advantages flow from the elimination of this preheating requirement. Through the use of the oil disclosed herein launchings and flights of missiles are more successful than they have been heretofore. This advantage is particularly true for missiles launched from aircraft, or air-to-air missiles, where considerable equipment connects the missile to the aircraft from which it is launched, or the mother aircraft. A considerable part of this connecting equipment has served the purpose of preheating the oil within the missile.

The use of the oil which is disclosed herein materially reduces the weight of the missile and correspondingly increases the range of its operational efficiency. The use of the oil disclosed herein materially reduces the time necessary to prepare the missile for flight. The use of the contemplated oil is of further advantage in that it substantially removes the adverse effects on the selectability and the dependability of aircraft which is burdened by the requirement that heating and related equipment be carried by the missile.

It will be noted that mixed base stock provides the proper viscosity and the basic property requirements of the oil. The 2,6-ditertiary butyl 4-methyl phenol content of the oil has the beneficial functions of inhibiting oxidation, corrosion and hydrolysis. The dichlorotrifluoro propane content of the oil may, where desired, be replaced with difluoropentachloro propane since both serve as snuffer additives in decreasing the flammability and in improving the antiwear and the lubricity of the oil.

The composition of the oil which is contemplated hereby may be modified by the substitution of materials exhibiting comparable chemical and physical properties without departing from the spirit and the scope of the present invention.

What I claim is:

1. A low temperature low viscosity hydraulic oil consisting of a mixed base stock and an additive, wherein the mixed base stock consists of a dimethyl silicone oil polymerized to a viscosity of about 100 centistokes present by weight in an amount within the range of about from 42 to 58% of the hydraulic oil and a dimethyl silicone oil polymerized to a viscosity of about 2 centistokes present by weight in an amount within the range of about from 30 to 46% of the hydraulic oil, and the additive consisting of a snuffer selected from the group consisting of difluoropentachloro propane and dichlorotrifluoro propane in an amount by weight within the range of about 6 to 14% of the hydraulic oil and an oxidation inhibitor consisting of 2,6 ditertiary butyl 4 methyl phenol in an amount by weight within the range of about between 0.3 and 1.5% of the hydraulic oil.

2. A hydraulic oil having the composition by weight of about: a mixed base stock of 50.0%±8% by wt. dimethyl silicone oil (100 cs.)
38.0%±8% by wt. dimethyl silicone oil (2 cs.)

with additives consisting of 11.3%+2.7% to −5.3% by wt. dichlorotrifluoro propane
0.7%+0.8% to −0.4% by wt. 2,6 ditertiary butyl 4 methyl phenol

References Cited in the file of this patent

UNITED STATES PATENTS

| | | |
|---|---|---|
| 2,384,384 | McGregor | Sept. 4, 1945 |
| 2,457,436 | Bennett | Dec. 8, 1948 |
| 2,676,193 | Ruh | Apr. 20, 1954 |